Patented Sept. 17, 1940

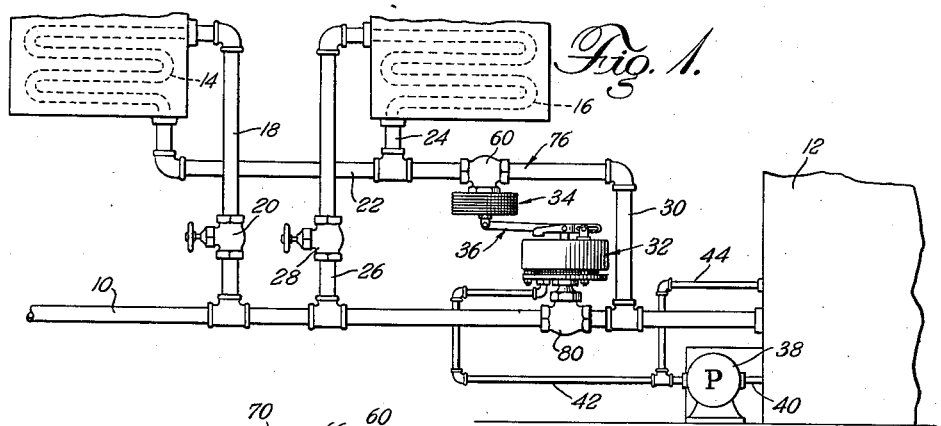
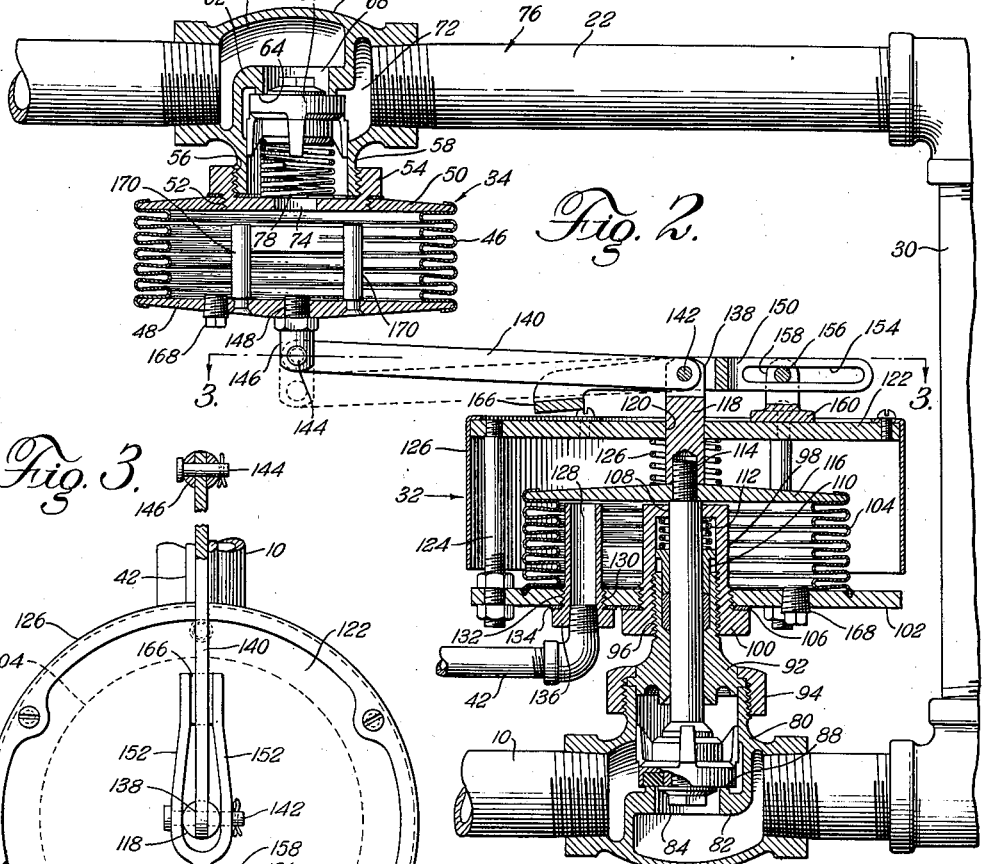

2,215,390

UNITED STATES PATENT OFFICE 2,215,390

WATER CIRCULATING SYSTEM

Victor R. Carlson, Chicago, Ill.

Application February 23, 1938, Serial No. 192,138

1 Claim. (Cl. 137—78)

My invention relates to water circulating systems and includes among its objects and advantages the provision of an improved valve control.

The invention in the instant case is particularly adapted for use in connection with washers such as are employed in connection with dairy machinery, breweries, beverage manufacturing installations, etc. In such plants, the washers require large amounts of water. In addition to the washers, condensers, refrigerating systems, etc., are employed, all of which require large amounts of water. The washing machinery is connected with the city water pressure as a supply. Much of the washing is done under average city pressure while other washing stages are performed under higher pressures. High pressure water for washing purposes represents re-circulation of low pressure water previously delivered to the washer or accumulation of high and low pressure water. The high pressure is generated by a pressure pump operatively connected with the washer.

In conventional systems, the water employed in connection with condensers, refrigerating systems, etc., is delivered directly to the sewer after it has served its cooling purpose. Water employed for cooling or condensing purposes is entirely satisfactory for washing purposes, but so far as I am aware no attempt has been made to utilize such waste water for washing purposes. The present invention contemplates a system and a valve control therefor which is so designed as to permit the utilization of waste water for washing purposes in conjunction with the water taken directly from the city main.

An object of the present invention is to provide a system of the type described in which water employing machinery may be interconnected in such a manner as to utilize waste water for washing purposes and in which the system is automatic in operation so as to eliminate the necessity of personal attention.

A further object is to provide a system of the type described in which a washer connected with a city supply may utilize water employed in other machinery and in which an automatic valve system is employed for delivering the otherwise waste water to the washing machinery.

A further object is to provide a water circulating system embodying a washer having a direct connection with the city supply and in which a by-pass circuit is also connected with the city supply and the washer and in which a novel valve mechanism is employed for automatically limiting the amount of water passing directly to the washer as the volume of water passing through the by-pass circuit is increased.

A further object is to provide a water circulating system utilizing normal city pressure in which a pressure pump is employed for generating a high water pressure circuit and in which a novel responsive valve system is employed for automatically controlling the circulation of the water. The valve system is responsive to the high pressure and is so devised as to bring about instantaneous opening and closing of the water line upon starting and stopping of the pressure pump.

Another important feature resides in the provision of a novel adjustment for the valve mechanism to the end that it may be accurately adjusted for sensitivity in relation to variable pressure conditions which might be employed.

In the accompanying drawing:

Fig. 1 is a diagrammatic view of a water circulating system embodying my invention;

Fig. 2 is an enlarged sectional view of the pressure operated valve mechanism; and Fig. 3 is a view taken from the position indicated by line 3—3 of Fig. 2.

In the embodiment selected to illustrate my invention, I make use of a pipe 10 which is connected with the city water main for supplying water to the washer 12. Washing machinery employed in dairy installations, etc., is well known in the art and need not be described in detail. Suffice it to say that much of the washing is done under ordinary city pressure while other washing stages are performed under higher pressures. In Fig. 1, I have illustrated diagrammatically cooling coils 14 and 16 which may be associated with coolers, condensers, or the like. Coil 14 is connected with the pipe 10 through the medium of a pipe 18 provided with a water control valve 20. The opposite end of the coil 14 is connected with a pipe 22 which is connected with one end of the coil 16 through the medium of a branch pipe 24. The opposite end of the coil 16 is connected with the pipe 10 by a pipe 26 provided with a water control valve 28. Pipe 22 is connected with pipe 10 through the medium of a reach 30. The coils 14 and 16 and the pipes connecting the same with the pipe 10 might be defined as a by-pass circuit.

A pressure operated valve unit 32 is interposed in the pipe 10 while a similarly operated valve unit 34 is interposed in the pipe 22. The two valve units are interconnected through the medium of a linkage 36. As a general rule, the average pressure in the pipe 10 approximates eight to ten pounds. Valve unit 32 is designed so as to be preferably responsive to a pressure of approximately forty pounds. The flow of water in the pipe 10 into the washer 12 is controlled by the valve unit 32.

In Fig. 1, the pressure pump 38 may be operated through the medium of any suitable source of power such as an electric motor, not shown. Pump 38 communicates with the washer 12 through the medium of a pipe 40 while a pipe 42 connects the pump 38 with the valve unit 32. High pressure water for washing purposes is taken from the lower part of the washer 12 through the pipe 40 and is delivered to the washer through the medium of a return pipe 44. Valve unit 32 remains closed except when the pressure pump 38 is in operation.

In Fig. 2, the valve unit 34 comprises a pressure responsive bellows 46 which includes a base plate 48 and a cover plate 50. Cover plate 50 includes a threaded opening 52 for the reception of a threaded plug 54 having a threaded bore 56 for the reception of the threaded neck 58 of the valve body 60. Valve body 60 includes the usual partition 62 provided with a valve seat 64 normally closed by the valve 66. Partition 62 includes a port 68 which establishes communication between the inlet chamber 70 and the outlet chamber 72 when the valve 66 is depressed out of closing relation with its seat 64. Neck 58 has communication with the chamber 72 while the plug 54 is provided with an opening 74 which communicates with the bellows 46.

In operation, water under pressure in the chamber 70 operates to depress the valve 66 to permit the flow of water through the valve body and into the reach 76 of the pipe 22. With no water under pressure in the chamber 70 but with water under pressure in the reach 76 and the chamber 72, the valve 66 is urged into closing relation with the seat 64. I interpose a compression spring 78 between the valve 66 and the plug 50 so as to positively urge the valve 66 to a closing position in the absence of pressure effective on its upper end.

Valves 20 and 28, when opened, establish communication between the pipe 10 and the coils 14 and 16 and control the flow therethrough. With the valve unit 32 closed, as when the pressure pump 38 is inoperative, the water pressure in the pipe 22 is sufficient to open the valve 66 to permit the passage of such water to the washer 12. However, should the valves 20 and 28 be closed, any back pressure from the washer 12 will close the valve 66 so as to prevent return flow of water into the coils 14 and 16.

Valve unit 32 comprises a valve body 80 interposed in the pipe 10 and includes the usual partition 82 provided with an opening 84. The valve 86 is arranged to bear on the seat 88 for closing purposes and is provided with a stem 90 slidable in a neck 92 connected with the valve body 80 in the usual manner through the medium of a coupling 94. Neck 92 includes a threaded reach 96 upon which is mounted a sleeve 98 having a flange 100 lying adjacent the bottom plate 102 of the bellows 104. A gasket 106 may be positioned between the flange 100 and the plate 102 to provide an effective seal.

The upper end of the sleeve 98 is provided with an opening 108 for slidably receiving the stem 90 while a packing gland 110 is housed inside the sleeve 98 and embraces the stem 90 for sealing purposes. A compression spring 112 is interposed between the gland 110 and the upper end of the sleeve 98 for compressing the gland. At the upper end of the stem 90, I provide a threaded reach 114 which has threaded relation with the cover plate 116 of the bellows 104 and is threadedly connected with a post 118 slidable in the opening 120 in a supporting plate 122. The supporting plate 122 is supported in fixed relation with the plate 102 through the medium of spacing bolts 124. The plate 102 may be provided with a depending flange 126 which constitutes a housing for the bellows 104. I position a compression spring 126 between the plate 116 and the supporting plate 122, which spring is effective on the bellows 104 for collapsing purposes.

The pipe 42 has communication with an upstanding tube 128 located inside the bellows 104. Tube 128 is opened at its upper end, which upper end terminates in close relation with the plate 116 in the collapsed position of the bellows. I provide the tube 128 with a threaded reach 130 anchored in the threaded bore 132 in the plate 102. A gasket 134 may be positioned between the flange 136 of the tube 128 and the plate 102.

With the pressure pump 38 operating, water under pressure is delivered to the bellows 104, and the pressure therein causes the bellows to expand for lifting the valve 86 off its seat 88. Thus, city water can be delivered to the washer 12 only when the pressure pump 38 is in operation except when water is being by-passed through the coils 14 and 16. Because of the tube 128, the bellows 104 will be full of water in its collapsed condition even though the pressure pump 38 is inactive. Because of the full condition of the bellows 104, the valve 86 is opened immediately upon starting of the pressure pump. With the valves 20 and 28 closed, city water can be delivered to the washer 12 only when pump pressure is applied to the bellows 104.

Post 118 is slotted at 138 for the reception of one end of a lever 140 pivotally connected with the post at 142. The opposite end of the lever 140 is pivotally connected at 144 with a post 146 having threaded connection at 148 with the plate 48. A lever 150 includes branches 152 which are pivotally mounted on the pin 142 which constitutes the pivotal connection for the lever 140. Lever 150 is slotted at 154 for the reception of a pin 156 carried by lugs 158 carried by a base 160 anchored to the supporting plate 122 by screws 162. The plate is provided with a series of threaded openings 164 which permits the base 160 to be anchored in different positions for shifting the pin 156 longitudinally of the slot 154. The outer ends of the branches 152 are interconnected by a bar 166 which extends underneath the lever 140.

In operation, the valves 20 and 28 may be closed and city water delivered to the washer 12 by starting the pump 38, which opens the valve 86. The washer 12 requires low and high pressure water for working purposes, and the two pressures are employed at the same time. During the operation of the washer 12, water may be required for the coils 14 and 16, and the water circulating therethrough is delivered to the washer 12 through the valve unit 34 and the pipe reach 30. The amount of water passing through the cooling coils will of course depend upon how far the valves 20 and 28 are opened. The water pressure in the coils will, of course, be less than the normal city pressure, but in any event, the pressure will be sufficient to depress the valve 66 for opening the same and delivering the water to the washer 12. Such effective water pressure is also effective on the bellows 46, which causes the latter to extend and impart pressure on the lever 140, which causes the latter to have pressure relation with the bar 166. When the lever 140 is brought into pressure relation with the bar 166, the levers 140 and 150 are rigidly connected, which causes the two levers to pivot downwardly about the pin 156 as an axis. During such pivotal action, the post 118 is depressed, which applies pressure on the plate 116, which pressure is also effective on the bellows 104.

Under such conditions, even though the pressure pump 38 is operating, the effective pressure in the bellows 46, which is transmitted to the bellows 104 through the medium of the linkage 36, causes the stem 90 to be moved downwardly for bringing the valve 86 in closer relation with its seat 88. Shifting of the valve 86 in its closing direction restricts the amount of water which may flow through the valve body 80 from the pipe 10, thus permitting waste water from the coils 14 and 16 to be delivered to the washer 12.

The effective pressure on the valve 86 will, of course, depend upon the amount of water passing through the coils. As the pressure increases, the valve 86 will, of course, be moved further in the direction of its valve seat, thus additionally restricting the amount of water which may pass through the unit 32. When once the linkage 36 has been properly adjusted under the operating conditions of a given installation, the valve unit 34 is sensitive to variable pressure in the by-pass circuit to such a degree as to increase and decrease the passage of water through the valve unit 32 in proportion to the decreased or increased pressures in the by-pass circuit. When operating under maximum pressure in the by-pass circuit, the valve unit 32 may become substantially closed, but any slight decrease in the pressure of the by-pass circuit immediately reacts on the valve unit 32 for increasing the amount of water passing therethrough to the end that a proper supply may be maintained at the washer.

Pin 156 is easily shifted by moving the base 160 relatively to the supporting plate 122. The levers 140 and 150, when made rigid through the medium of the bar 166, multiply the effective pressure in the bellows 46 in opposition to the pressure in the bellows 104 so that the valve 86 may be controlled by the lower pressures in the by-pass circuit. In restricting the amount of water which may pass through the valve body 80 during the delivery of water to the coils 14 and 16, I provide a system which insures utilization of all the cooling water for washing purposes while supplementing the deficiency in the volume of by-pass water with direct delivery of city water.

While I have illustrated two coils 14 and 16, additional coils or water utilizing machinery may be interposed in the by-pass circuit. The coils may be operated independently or simultaneously. With no pressure in the by-pass circuit, any back pressure effective therein merely supplements the closing action of the spring 78 so that water cannot pass through the valve unit 34. Spring 78 in the absence of by-pass pressure on the coil side of the unit 34 has sufficient tension to positively close the valve 66. Valve unit 32 will open in response to pump pressure only. In addition to providing a system in which I utilize heretofore waste water for washing purposes and in which the direct delivery of city water is automatically controlled by the effective pressure in the by-pass circuit, the valve unit 34 closes immediately upon stopping of the pressure pump. Thus, valve unit 32 requires no attention in that its operation is controlled by the starting and stopping of the pressure pump.

In Fig. 2, I illustrate the plate 48 of the bellows 46 and the plate 102 of the bellows 104 as being provided with cleanout plugs 168. Fig. 2 also illustrates the plate 48 as being provided with two posts 170 arranged to engage the plate 50 to limit the collapsing action of the bellows 46. With the bellows 46 collapsed and little or no pressure therein and upon sudden opening of the valve 86, considerable force may be transmitted to the linkage 36 in the collapsing direction of the bellows 46. The posts will prevent collapsing of the bellows beyond a predetermined degree so as to lend protection thereto.

Valve unit 32 includes in part a conventional valve, such as the body 80 and the valve 86. The sleeve 42 constitutes a mounting or anchorage for the bellows 104 while the bellows is directly connected with the stem 90 through the medium of the plate 116.

Without further elaboration, the foregoing will so fully explain my invention that others may, by applying current knowledge, readily adapt the same for use under various conditions of service.

I claim:

In a water circulating system of the type described, including a washing machine and a water cooled machine, a pipe for connecting the washing machine with a water supply, a valve in said pipe, a bypass water circuit connected with said pipe on opposite sides of said valve, said water cooled machine being interposed in said bypass circuit, a valve means interposed in said bypass circuit, and an operating connection between said first valve and said valve means, said valve means being responsive to pressure in the bypass circuit for actuating said first mentioned valve to limit the flow of water in said pipe in accordance with the pressure in the bypass circuit, said valve means being responsive to back pressure in the bypass circuit to prevent back pressure water from the washer from being delivered to said water cooled machine.

VICTOR R. CARLSON.